US010062331B2

(12) United States Patent
Kim et al.

(10) Patent No.: US 10,062,331 B2
(45) Date of Patent: Aug. 28, 2018

(54) DISPLAY DEVICE FOR CONTROLLING LUMINANCE AND METHOD FOR DRIVING THE SAME

(71) Applicant: LG Display Co., Ltd., Seoul (KR)

(72) Inventors: Jae-Hong Kim, Paju-si (KR); Hee-Eun Lee, Paju-si (KR); Su-Hyun Kwon, Daegu (KR)

(73) Assignee: LG Display Co., Ltd., Seoul (KR)

( * ) Notice: Subject to any disclaimer, the term of this patent is extended or adjusted under 35 U.S.C. 154(b) by 173 days.

(21) Appl. No.: 15/148,773

(22) Filed: May 6, 2016

(65) Prior Publication Data

US 2016/0351133 A1 Dec. 1, 2016

(30) Foreign Application Priority Data

May 28, 2015 (KR) ........................ 10-2015-0074986

(51) Int. Cl.

*G06F 3/038* (2013.01)
*G09G 3/34* (2006.01)
*G09G 3/36* (2006.01)

(52) U.S. Cl.

CPC ......... *G09G 3/3406* (2013.01); *G09G 3/3648* (2013.01); *G09G 2320/0276* (2013.01); *G09G 2320/064* (2013.01); *G09G 2320/066* (2013.01); *G09G 2354/00* (2013.01); *G09G 2360/144* (2013.01)

(58) Field of Classification Search

CPC ............... G09G 3/3406; G09G 3/3648; G09G 2360/144; G09G 2320/0276

See application file for complete search history.

(56) References Cited

U.S. PATENT DOCUMENTS

2003/0214242 A1* 11/2003 Berg-johansen ......... G09G 3/14 315/169.3
2008/0049050 A1* 2/2008 Sagano .................... G09G 3/22 345/690

(Continued)

FOREIGN PATENT DOCUMENTS

CN 101203797 6/2008
CN 103890835 6/2014

OTHER PUBLICATIONS

First Office Action for Chinese Patent Application No. CN 201610365834.1, dated Apr. 4, 2018, 17 Pages.

*Primary Examiner* — Jonathan Blancha
(74) *Attorney, Agent, or Firm* — Fenwick & West LLP

(57) ABSTRACT

The present invention relates to a display device which can provide optimal luminance and visibility to viewers by considering a viewing environment, a viewing distance and image characteristics in an associated manner and a method for driving the same. The method for driving a display device includes: determining final luminance by applying sensed results of ambient illumination, ambient temperature and a viewing distance from a user in an associated manner; adjusting luminance of the display device according to the determined final luminance; and calculating a weighted average picture level (WAPL) from an input image, calculating a differential gain per gray level according to the calculated WAPL, correcting the input image by applying the calculated differential gain per gray level to the input image and outputting the corrected input image.

7 Claims, 2 Drawing Sheets

(56) References Cited

U.S. PATENT DOCUMENTS

| | | | | |
|---|---|---|---|---|
| 2008/0291139 | A1* | 11/2008 | Hsieh | G09G 3/20 345/77 |
| 2009/0091560 | A1* | 4/2009 | Ferguson | G09G 3/3406 345/207 |
| 2010/0295877 | A1* | 11/2010 | Yun | G09G 3/3406 345/690 |
| 2011/0032285 | A1* | 2/2011 | Yao | G09G 3/3406 345/690 |
| 2011/0163691 | A1* | 7/2011 | Dunn | G09G 3/3426 315/297 |
| 2014/0055335 | A1* | 2/2014 | Liu | G09G 5/10 345/102 |
| 2014/0125711 | A1* | 5/2014 | Onishi | G09G 3/3406 345/690 |

* cited by examiner

DISPLAY DEVICE FOR CONTROLLING LUMINANCE AND METHOD FOR DRIVING THE SAME

CROSS-REFERENCE TO RELATED APPLICATIONS

This application claims the benefit of Republic of Korea Patent Application No. 10-2015-0074986, filed on May 28, 2015, which is hereby incorporated by reference as if fully set forth herein.

BACKGROUND

Field of the Invention

The present invention relates to a display device and, more particularly, to a display device which can provide optimal luminance and visibility to viewers by considering a viewing environment, a viewing distance and image characteristics in an associated manner and a method for driving the same.

Discussion of the Related Art

Distinguished from IT/mobile devices or TVs, outdoor display devices are used in various surrounding environments and user environments and need to display images with high luminance in the range of 1500 to 2000 nit. For example, outdoor display devices are exposed to very high ambient illumination to very low ambient illumination and to very high temperature to very low temperature since the outdoor display devices are installed in extreme environments of day and night. Furthermore, a recent outdoor display device has been combined with IoT (Internet of things) and developed to a form attached to a touchscreen, such as a personal device. Accordingly, outdoor display devices are used in environments having various viewing distances including a short distance to a very long distance between the outdoor display devices and users.

Therefore, it is necessary to control picture quality of outdoor display devices according to surrounding environments and user environments. However, when methods for controlling picture quality of display devices of the related art are applied to outdoor display devices, the following problems are generated.

For example, a liquid crystal display (LCD) of the related art uses a method of controlling luminance according to illumination or temperature, a method of controlling luminance according to viewing distance or a method of correcting gamma according to average luminance of an input image as a picture quality control technique.

However, when the LCD controls luminance according to illumination only, luminance deterioration characteristics of the LCD according to temperature are not reflected in luminance control and high luminance causes glare when a viewing distance is very short, and thus luminance suitable for viewers cannot be provided. When the LCD controls luminance according to viewing distance only, visibility of an output image decreases extremely due to low luminance when ambient illumination is high. In addition, when the LCD controls luminance according to illumination or viewing distance only, image characteristics are not reflected in luminance control and thus gray-level banding may occur in an output image when the image is output with low luminance, resulting in image distortion. When only gamma correction is controlled according to average luminance of an input image, visibility decreases since the surrounding environment and viewing distance are not considered, and the luminance of an image having a highlighted part on a black background is deteriorated due to low average luminance, resulting in picture quality decrease.

As described above, the LCD picture quality control techniques of the related art are not suitable for outdoor display devices since the techniques do not consider viewing environments, viewing distances and image characteristics in an associated manner and thus luminance unsuitable for viewers may be output or image distortion may occur.

Furthermore, the aforementioned problems may be generated in various display devices including an organic light-emitting diode (OLED) display as well as the LCD and even in display devices for various purposes in addition to outdoor display devices. Accordingly, the present invention is not limited to LCD or outdoor display devices.

SUMMARY

An object of the present invention devised to solve the problem lies in a display device which can provide optimal luminance and visibility to viewers by considering a viewing environment, a viewing distance and image characteristics in an associated manner and a method for driving the same.

In an aspect of the present invention to accomplish the object, a method for driving a display device includes: determining final luminance by applying sensed results of ambient illumination, ambient temperature and a viewing distance from a user in an associated manner; adjusting luminance of the display device according to the determined final luminance; and calculating a weighted average picture level (WAPL) from an input image, calculating a differential gain per gray level according to the calculated WAPL, correcting the input image by applying the calculated differential gain per gray level to the input image and outputting the corrected input image.

The present invention may control the luminance of the display device by adjusting luminance of a backlight unit of a liquid crystal display or adjusting a maximum gamma voltage of an organic light-emitting diode display device, according to the final luminance.

In another aspect of the present invention, a display device includes: a surrounding environment sensing unit for sensing ambient illumination and ambient temperature and outputting the sensed ambient illumination and ambient temperature; a viewing distance sensing unit for sensing a viewing distance from a user and outputting the sensed viewing distance; a luminance controller for determining final luminance by applying the sensed ambient illumination, ambient temperature and viewing distance and adjusting luminance of the display device according to the determined final luminance; an image processor for calculating a WAPL from an input image, calculating a differential gain per gray level according to the calculated WAPL, correcting the input image by applying the calculated differential gain per gray level to the input image and outputting the corrected input image; and a panel driver for displaying the corrected image output from the image processor on a display panel.

The luminance controller may set maximum luminance according to the sensed ambient illumination, selectively correct the maximum luminance according to the sensed ambient temperature and determine the final luminance by further selectively correcting the selectively corrected maximum luminance according to the sensed viewing distance.

The luminance controller may set the maximum luminance A according to the sensed ambient illumination by an equation of "$A=1.65\times$ambient illumination$+121.83$".

The maximum luminance A may be corrected such that luminance reduced according to the sensed ambient temperature is compensated only when the sensed ambient temperature exceeds a predetermined temperature range and the maximum luminance A may not be corrected in other cases.

The final luminance B may be determined according to an equation of "B=(viewing distance$^{0.46}$×A)÷display area" in consideration of the selectively corrected maximum luminance A, the sensed viewing distance and a display area of the display device.

The display device according to the present invention may include a backlight unit for emitting light to a liquid crystal display panel corresponding to the display panel, and a backlight driver for driving the backlight unit, wherein the luminance controller adjusts luminance of the backlight unit by supplying a luminance control signal according to the final luminance to the backlight driver.

The display panel of the display device according to the present invention may be an organic light-emitting diode display panel, wherein the luminance controller controls luminance of the organic light-emitting diode display panel by adjusting a maximum gamma voltage used in the panel driver according to the final luminance.

The display device and method for driving the same according to the present invention can provide optimal luminance according to viewing environment and viewing distance by considering the viewing environment, viewing distance and image characteristics in a combined manner and output images having improved contrast, brightness and saturation by applying an optimal gamma curve according to image characteristics, thereby providing high visibility and improving picture quality.

DETAILED DESCRIPTION OF THE INVENTION

Figure 1:
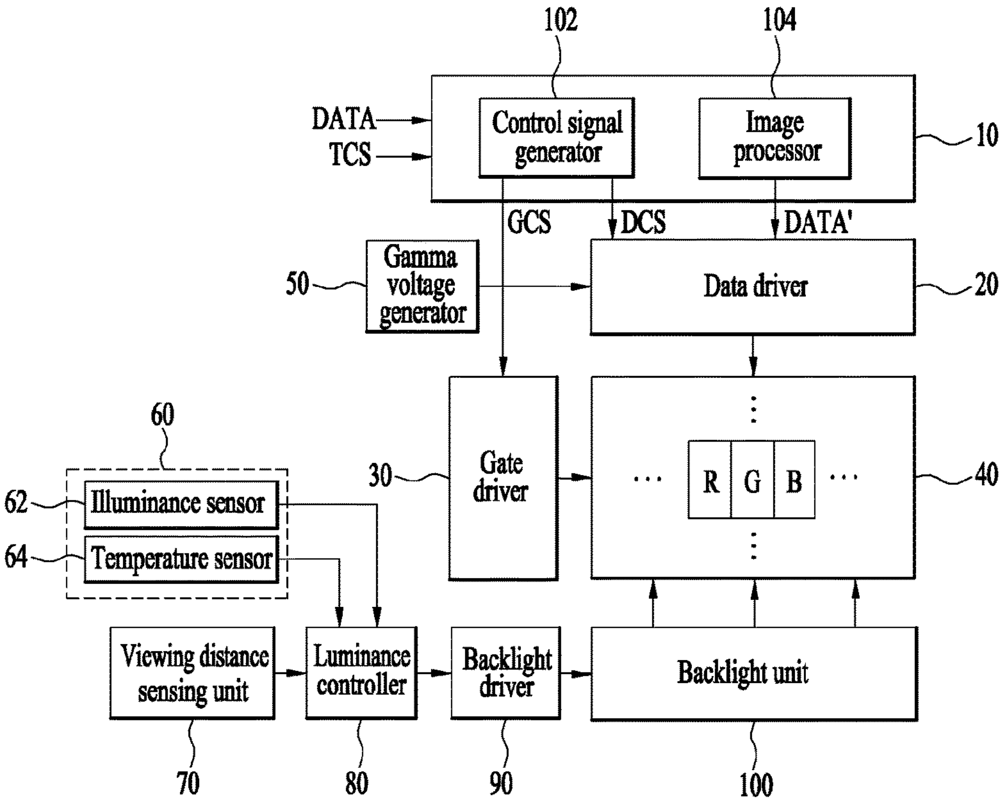
FIG. 1 is a block diagram of an LCD according to an embodiment of the present invention.
Figure 2:
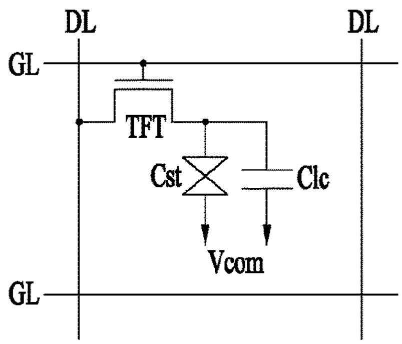
FIG. 2 is an equivalent circuit diagram illustrating a configuration of each sub-pixel shown in FIG. 1.
Figure 3:
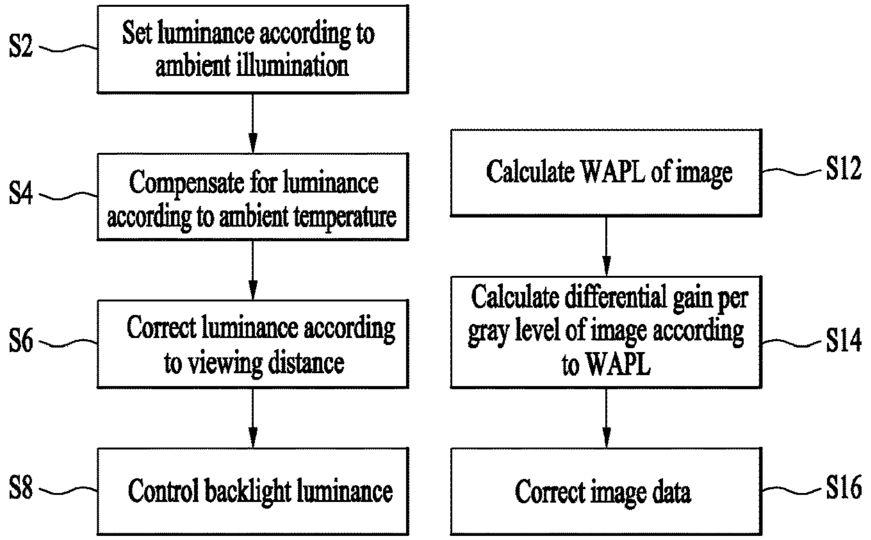
FIG. 3 is a flowchart illustrating a method for driving an LCD according to an embodiment of the present invention.

FIG. 1 is a block diagram of an LCD according to an embodiment of the present invention, FIG. 2 is an equivalent circuit diagram illustrating a configuration of each sub-pixel shown in FIG. 1 and FIG. 3 is a flowchart illustrating a method for driving a luminance controller and an image processor shown in FIG. 1.

The LCD illustrated in FIG. 1 may include a timing controller 10, a data driver 20 and a gate driver 30, which correspond to a panel driving unit, a display panel 40, a gamma voltage generator 50, a surrounding environment sensing unit 60, a viewing distance sensing unit 70, a luminance controller 80, a backlight driver 90, a backlight unit 100 and a power supply (not shown).

The display panel 40 may include a color filter substrate on which a color filter array is formed, a thin film transistor substrate on which a thin film transistor array is formed, a liquid crystal layer interposed between the color filter substrate and the thin film transistor substrate, and polarizers respectively attached to the outer sides of the color filter substrate and the thin film transistor substrate. The display panel 40 may display images through a pixel matrix. Each pixel may be composed of red (R), green (G) and blue (B) sub-pixels and may additionally include a white (W) sub-pixel having higher luminance efficacy than the RGB sub-pixels.

As shown in FIG. 2, each sub-pixel includes a thin film transistor (TFT) coupled to a gate line GL and a data line DL, and a liquid crystal capacitor Clc and a storage capacitor Cst. The liquid crystal capacitor Clc and a storage capacitor Clc are connected in parallel between the thin film transistor TFT and a common voltage Vcom. The liquid crystal capacitor Clc charges a difference voltage between a data signal supplied to a pixel electrode through the thin film transistor TFT and the common voltage Vcom supplied to a common electrode and controls light transmittance by driving liquid crystal according to the charged voltage. The storage capacitor Cst maintains the voltage charged in the liquid crystal capacitor Clc.

The data driver 20 receives data control signals DCS and image data DATA' from the timing controller 10. The data driver 20 is driven by the data control signals DCS to segment a reference gamma voltage set supplied from the gamma voltage generator 50 into gray-level voltages respectively corresponding to gray-level values of data and then converts the digital image data DATA' into an analog image data signal using the segmented gray-level voltages.

The data driver 20 is composed of a plurality of data driver integrated circuits (ICs) which separately drive data lines of the display panel 40. The data driver ICs may be mounted on a circuit film such as a TCP (Tape Carrier Package), COF (Chip On Film) and FPC (Flexible Print Circuit) and attached to the display panel 40 through TAB (Tape Automated Bonding) or mounted on the display panel 40 according to COG (Chip On Glass).

The gate driver 30 drives a plurality gate lines of the display panel 40 using a gate control signal GCS supplied from the timing controller 10. The gate driver 30 supplies a scan pulse of a gate on voltage to each gate line during a corresponding scan period in response to the gate control signal and provides a gate off voltage in the remaining period. The gate driver 30 may receive the gate control signal GCS from the timing controller 10 or receive the gate control signal GCS via the data driver 20 from the timing controller 10. The gate driver 30 may include at least one gate IC and may be mounted on a circuit film such as a TCP, COF and FPC and attached to the display panel 40 through TAB or mounted on the display panel 40 according to COG. Alternatively, the gate driver 30 may be provided as a GIP (Gate In Panel) type embedded in a non-display area of the display panel 40 by being formed on the thin film transistor substrate along with the thin film transistor array constituting a pixel array of the display panel 40.

The backlight unit 100 uses a fluorescent lamp such as a cold cathode fluorescent lamp (CCFL) and an external electrode fluorescent lamp (EEFL) or a direct type or edge type backlight including LEDs as light sources. The direct type backlight includes light sources arranged in the entire display area to face the backside of the display panel 40, a light guide plate provided on the light sources, and a plurality of optical sheets. Light emitted from the light sources is input to the display panel 40 through the optical sheets. The edge type backlight includes a light guide plate facing the backside of the display panel 40, light sources arranged to face at least one edge of the light guide plate, and a plurality of optical sheets arranged on the light guide plate. Light emitted from the light sources is converted into surface light through the light guide plate and input to the display panel 40 through the optical sheets.

The backlight driver 90 drives the backlight unit 100 by generating a pulse width modulation (PWM) signal having a duty ratio according to a luminance control signal from the luminance controller 80 and supplying a light source driving signal corresponding to the PWM signal. The backlight driver 90 may generate the PWM signal on the basis of a vertical synchronization signal which is a frame discrimination signal input from an external system or the timing controller 10 for synchronization of the backlight unit 100 and the display panel 40.

The luminance controller 80 controls the luminance of the backlight unit 100 by considering a surrounding environment sensed by the surrounding environment sensing unit and a viewing distance sensed by the viewing distance sensing unit 70. The surrounding environment sensing unit 60 includes an illuminance sensor 62 for sensing ambient illumination and a temperature sensor 64 for sensing ambient temperature. The viewing distance sensing unit 70 may sense a viewing distance between the display panel 40 and a viewer using a distance sensor and output the sensed viewing distance or determine a viewing distance according to whether a touchscreen (not shown) attached to the display panel 40 is operated and output the viewing distance.

Referring to FIG. 3, the luminance controller 80 sets luminance according to the ambient illumination sensed by the illuminance sensor 62 (S2), selectively corrects the luminance according to the ambient temperature sensed by the temperature sensor 64 (S4), further selectively corrects the luminance according to the viewing distance sensed by the viewing distance sensing unit 70 to determine final luminance (S6) and controls the luminance of the backlight unit 100 on the basis of the determined final luminance.

Since the ambient illumination greatly affects visibility of the display device, the luminance controller 80 sets maximum luminance first according to intensity of the ambient illumination sensed by the illuminance sensor 62 (S2).

For example, when the ambient illumination is high, the maximum luminance is set to a high level since visibility remarkably decreases when the luminance of the display device is low. When the ambient illumination is low, the maximum luminance is set to a low level since visibility excessively increases and power consumption increases when the luminance of the display device is high. For example, the maximum luminance can be set to 204 nit in the evening when the ambient illumination is low (average illumination of 50 lux), set to 1772 nit in cloudy daylight (average illumination of 1000 lux) and or set to 2000 nit when the ambient illumination is higher than 1000 lux.

The luminance controller 80 may determine a luminance value A, that is, maximum luminance according to intensity of illumination using Equation 1.

$$\text{Luminance value } A \text{ according to illumination} = 1.65 \times \text{illumination} + 121.83 \quad \text{<Equation 1>}$$

Subsequently, the luminance controller 80 selectively corrects the maximum luminance A according to the ambient temperature sensed by the temperature sensor 64 (S4). When the ambient temperature of the LCD is extremely low (e.g. below −10° C.) or is high (e.g. higher than 70° C.), the luminance of the LCD can be reduced by about 20% irrespective of backlight output power. To prevent this, the luminance controller 80 compensates for luminance decreased due to the ambient temperature by correcting the maximum luminance A using a predetermined correction value when the ambient temperature sensed by the temperature sensor 64 exceeds a predetermined temperature range. For example, if appropriate maximum luminance is 204 nit when the ambient illumination is 50 lux and at room temperature, the maximum luminance of 204 nit is corrected to 245 nit to compensate for luminance reduced due to a low temperature in winter having ambient illumination of 50 lux.

The luminance controller 80 does not correct the maximum luminance A according to the ambient temperature when the sensed ambient temperature does not exceed the predetermined temperature range.

Subsequently, the luminance controller 80 prevents glare of the viewer by selectively controlling the maximum luminance A which has been corrected or has not been corrected according to the viewing distance sensed by the viewing distance sensing unit 70 (S6). When the viewing distance is short (e.g. within 75 cm or when a touch function is executed), the luminance controller 80 further controls the maximum luminance A which has been corrected or has not been corrected such that the viewer does not suffer eyestrain due to glare.

For example, luminance in the range of 1500 to 2000 nit or luminance higher than 2500 nit can be applied to an outdoor display device. In addition, since the outdoor display device is combined with IoT and developed to a display having a touchscreen attached thereto, users will use the outdoor display device having high luminance in proximity thereto. Accordingly, when a user uses an outdoor display device having high luminance within a short distance, eyestrain of the user due to glare abruptly increases. Furthermore, even if display devices have the same luminance, a display device having a larger display area is recognized as a bright display, resulting in eyestrain increase.

To prevent the viewer from suffering eyestrain due to glare, the luminance controller 80 calculates a luminance value B according to the viewing distance in consideration of the maximum luminance A set on the basis of the ambient illumination and selectively corrected on the basis of the ambient temperature, the viewing distance sensed by the viewing distance sensing unit 70 and the display area of the LCD, as represented by Equation 2, and determines the calculated luminance value B as final maximum luminance.

$$\text{Luminance value } B \text{ according to viewing distance} = (\text{viewing distance}^{0.46} \times A) \div \text{display area} \quad \text{<Equation 2>}$$

The luminance controller 80 controls the luminance of the backlight unit 100 by outputting a luminance control signal (dimming signal) according to the determined final maximum luminance B (S8).

For example, the maximum luminance can be set to 215 nit (@50 lux) and 1861 nit (@1000 lux) when the user views the outdoor display device from a distance of 75 cm for information search and can be reduced to 151 nit (@50 lux) and 1311 nit (@1000 lux) when the user approaches the outdoor display device within a viewing distance of 35 cm and touches the outdoor display device for information search.

The timing controller 10 receives image data DATA and timing signals TCS from an external host system. The timing controller 10 controls driving timing of the data driver 20 and the gate driver 30 using the input timing signals TCS, corrects the image data DATA according to image characteristics and outputs the corrected image data DATA' to the data driver 20. To this end, the timing controller 10 includes a control signal generator 102 and an image processor 104.

The control signal generator 102 generates data control signals DCS and gate control signals GCS using the input timing signals TCS and respectively output the data control signals DCS and the gate control signals GCS to the data driver 20 and the gate driver 30. The timing signals TCS input to the control signal generator 102 may include a dot clock signal, a data enable signal, a vertical synchronization signal and a horizontal synchronization signal. Here, the vertical synchronization signal and the horizontal synchronization signal may be omitted. When the vertical synchronization signal and the horizontal synchronization signal are omitted, the control signal generator 102 may generate the vertical synchronization signal and the horizontal synchronization signal by counting the data enable signal according to the dot clock signal. The data control signals DCS may include a source start pulse signal, a source sampling clock signal, a polarity control signal and a source output enable signal for controlling driving of the data driver 20. The gate control signals GCS may include a gate start pulse signal, a gate shift clock signal and a gate output enable signal for controlling driving of the gate driver 30.

Under the condition that the luminance of the display device is reduced, as described above, application of nonlinear gamma may generate grayscale banding in images, application of image histogram variation may deteriorate saturation and application of an average picture level (APL) may reduce the luminance of an image having a high contrast ratio due to a low APL.

To solve this, the image processor 104 according to the present invention can increase accuracy of an image analysis method using a weighted average picture level (WAPL) from the input image DATA and correct the image data according to image characteristics by applying a differential gain per gray level of the image data DATA using an S-shaped gain curve obtained according to the WAPL to improve gray-level differentiation, contrast and saturation. The image processor 104 may be included in the timing controller 10, as shown in FIG. 1, or located at the input terminal of the timing controller 10 and applied to a system chip such as an image processing engine.

The image processor 104 calculates a WAPL per frame from gray-level values of the input image DATA using Equation 3 (S12).

$$WAPL = \frac{\sum^{N} Gray_{in}^{2}}{\sum^{N} Gray_{in}} \quad \text{(Equation 3)}$$

Here, N indicates the number of sub-pixels included in a unit frame and Gray represents an input gray level of each sub-pixel.

Figure 4:
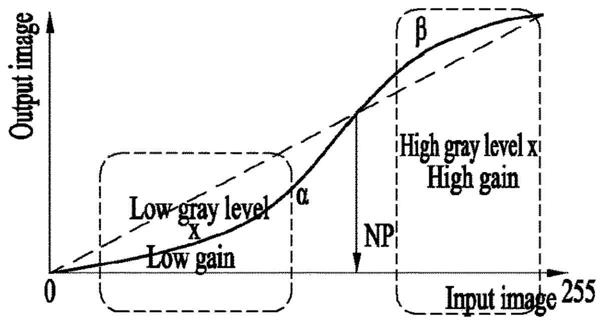
FIG. 4 is a gain graph using a WAPL applied to an image processor shown in FIG. 1.

The image processor 104 determines a frame gain according to calculated WAPLs and obtains an S-shaped gain graph having differential gains α and β according to gray levels 0 to 255 of the input image, as shown in FIG. 4, by multiplying the gamma curve of the display device by the frame gain (S14). The image processor 104 corrects the image data DATA by applying the differential gains α and β depending on the gray levels 0 to 255 of the input image according to the S-shaped gain graph and outputs the corrected image data DATA' (S16).

Referring to FIG. 4, low gain α is applied to low gray levels and high gain β is applied to high gray levels according to the S-shaped gain graph, and the inflection point NP of the S-shaped gain graph varies according to image characteristics since the inflection point NP controls saturation compensation. Here, α controls a degree of contrast enhancement of a low gray-level region and may be set in the range of 0.9 to 1.3. Luminance increases whereas low gray-level expression decreases as α decreases, and luminance decreases whereas low gray-level expression increases as α increases. β controls a degree of contrast enhancement of a middle gray-level region and may be set in the range of 1.3 to 1.7. Luminance decreases whereas high gray-level expression increases as β decreases, and luminance increases whereas low gray-level expression decreases as β increases. NP may be set in the range of 100 to 200 for saturation compensation control. Saturation increases as NP decreases, whereas saturation decreases as NP increases. Since a trade-off is generated according to control of NP, α and β, appropriate values of NP, α and β are derived according to an input image analysis result.

According to an embodiment of the present invention, an output image of the LCD becomes brighter than an input image, visibility of the input image is improved due to contrast increase and saturation also increases.

While the LCD is exemplified in the embodiment of the present invention, the present invention is applicable to OLED display devices. Specifically, the components of the LCD, except for the backlight driver 90 and the backlight unit 100, can be applied to an OLED display device. In this case, the luminance controller 80 applied to the OLED display device adjusts luminance by controlling a maximum gamma voltage EVDD according to maximum luminance determined based on the surrounding environment and viewing distance. In addition, the OLED display device can further control the maximum luminance according to WAPL in order to reduce power consumption.

As described above, the display device according to the present invention can provide optimal luminance according to the surrounding environment and viewing distance by sensing the surrounding environment including the ambient illumination and ambient temperature and the viewing distance and organically adjusting the luminance of the display device on the basis of the sensed ambient illumination and ambient temperature. In addition, the display device according to the present invention can correct image data by applying an S-shaped gain curve according to an image analysis result using a WAPL to the image data so as to improve gray-level differentiation, contrast and saturation according to image characteristics, thereby providing an image having enhanced visibility and picture quality to the viewer.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for driving a display device, comprising:

determining final luminance by applying sensed results of ambient illumination, ambient temperature and a viewing distance from a user in an associated manner;

adjusting luminance of the display device according to the determined final luminance;

calculating a weighted average picture level (WAPL) from an input image;

calculating a differential gain per gray level according to the calculated WAPL;

correcting the input image by applying the calculated differential gain per gray level to the input image; and outputting the corrected input image, wherein the determining of the final luminance comprises:

setting maximum luminance according to the sensed ambient illumination;

selectively correcting the maximum luminance according to the sensed ambient temperature; and determining the final luminance by further selectively correcting the selectively corrected maximum luminance according to a sensed viewing distance, wherein, if the sensed ambient temperature is lower or higher than a predetermined temperature range, the maximum luminance is increased to compensate luminance reduced according to the sensed ambient temperature, and wherein the maximum luminance according to the sensed ambient illumination is set according to an equation of:

$$A=1.65\times\text{ambient illumination}+121.83$$

where A represents the maximum luminance.

2. The method according to claim 1, wherein the final luminance is determined according to an equation of:

$$B=(\text{viewing distance}^{0.46}\times A)\div\text{display area}$$

where B represents the final luminance in consideration of the selectively corrected maximum luminance A, the sensed viewing distance and a display area of the display device.

3. The method according to claim 2, wherein the luminance of the display device is controlled by adjusting luminance of a backlight unit of a liquid crystal display or adjusting a maximum gamma voltage of an organic light-emitting diode display device, according to the final luminance.

4. A display device, comprising:

a surrounding environment sensing unit for sensing ambient illumination and ambient temperature and outputting the sensed ambient illumination and ambient temperature;

a viewing distance sensing unit for sensing a viewing distance from a user and outputting the sensed viewing distance;

a luminance controller for determining final luminance by applying the sensed ambient illumination, ambient temperature and viewing distance and adjusting luminance of the display device according to the determined final luminance;

an image processor for calculating a weighted average picture level (WAPL) from an input image, calculating a differential gain per gray level according to the calculated WAPL, correcting the input image by applying the calculated differential gain per gray level to the input image and outputting the corrected input image; and a panel driver for displaying the corrected image output from the image processor on a display panel, wherein the luminance controller sets maximum luminance according to the sensed ambient illumination, selectively corrects the maximum luminance according to the sensed ambient temperature and determines the final luminance by further selectively correcting the selectively corrected maximum luminance according to the sensed viewing distance, and wherein, if the sensed ambient temperature is lower or higher than a predetermined temperature range, the maximum luminance is increased to compensate luminance reduced according to the sensed ambient temperature, and wherein the luminance controller sets the maximum luminance A according to the sensed ambient illumination is set according to an equation of:

$$A=1.65\times\text{ambient illumination}+121.83.$$

5. The display device according to claim 4, wherein the final luminance B is determined according to an equation of:

$$B=(\text{viewing distance}^{0.46}\times A)\div\text{display area}$$

in consideration of the selectively corrected maximum luminance A, the sensed viewing distance and a display area of the display device.

6. The display device according to claim 5, further comprising a backlight unit for emitting light to a liquid crystal display panel corresponding to the display panel, and a backlight driver for driving the backlight unit, wherein the luminance controller adjusts luminance of the backlight unit by supplying a luminance control signal according to the final luminance to the backlight driver.

7. The display device according to claim 5, wherein the display panel is an organic light-emitting diode display panel, wherein the luminance controller controls luminance of the organic light-emitting diode display panel by adjusting a maximum gamma voltage used in the panel driver according to the final luminance.

* * * * *